United States Patent
Motegi et al.

(10) Patent No.: US 7,035,637 B2
(45) Date of Patent: Apr. 25, 2006

(54) LOCATION REGISTRATION AREA CONFIGURING METHOD, MOBILE COMMUNICATION SYSTEM, BASE STATION, AND LOCATION MANAGEMENT SERVER

(75) Inventors: Masayuki Motegi, Yokogama (JP); Hidetoshi Kayama, Yokohama (JP); Narumi Umeda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 380 days.

(21) Appl. No.: 10/310,834

(22) Filed: Dec. 6, 2002

(65) Prior Publication Data

US 2003/0109254 A1 Jun. 12, 2003

(30) Foreign Application Priority Data

Dec. 7, 2001 (JP) ............................. 2001-374644

(51) Int. Cl.
*H04Q 7/20* (2006.01)

(52) U.S. Cl. ............................ 455/435.1; 455/456.1; 455/429; 455/433; 455/446; 455/432.3

(58) Field of Classification Search ................ 455/561, 455/446, 433, 558, 432, 435.1, 456.1, 429, 455/432.3; 370/338, 349, 395.1, 422; 713/151, 713/164, 168
See application file for complete search history.

(56) References Cited

U.S. PATENT DOCUMENTS

| | | | |
|---|---|---|---|
| 5,361,396 A | 11/1994 | Onoe et al. | |
| 5,754,959 A | 5/1998 | Ueno et al. | |
| 5,864,764 A * | 1/1999 | Thro et al. | 455/561 |
| 6,041,228 A | 3/2000 | Niska et al. | |
| 6,292,891 B1 * | 9/2001 | Bergenwall et al. | 713/151 |
| 6,295,451 B1 * | 9/2001 | Mimura | 455/436 |
| 6,366,777 B1 * | 4/2002 | Uusitalo | 455/433 |
| 2003/0095520 A1 * | 5/2003 | Aalbers et al. | 370/338 |

FOREIGN PATENT DOCUMENTS

| | | |
|---|---|---|
| EP | 0 769 884 | 4/1997 |
| EP | 1 130 936 | 9/2001 |
| WO | WO 01/58193 | 8/2001 |

* cited by examiner

*Primary Examiner*—Erika A. Gary
*Assistant Examiner*—Wayne Cai
(74) *Attorney, Agent, or Firm*—Oblon, Spivak, McClelland, Maier & Neustadt, P.C.

(57) ABSTRACT

An object of the invention is to make improvement in the configuration of location registration areas. When a base station 13P is newly installed in a location registration area 30A, the base station 13P recognizes a location of its own with GPS or the like and performs communication with a plurality of surrounding base stations 13Q to select a location registration area 30A to which it should belong, based on the belonging status of the surrounding base stations 13Q and the location of its own. If the base station 13P is located near a boundary between location registration areas and if the surrounding base stations 13Q belong to a plurality of location registration areas, the location registration area to which the base station 13P should belong may be selected so as to average traffics in the respective location registration areas, or the location registration area with the smallest number of base stations belonging thereto may be selected so as to average the numbers of base stations in the respective location registration areas. The base station 13P broadcasts an area identifier of its belonging location registration area 30A to mobile stations under control thereof and starts provision of service thereto.

27 Claims, 13 Drawing Sheets

LOCATION REGISTRATION AREA CONFIGURING METHOD, MOBILE COMMUNICATION SYSTEM, BASE STATION, AND LOCATION MANAGEMENT SERVER

BACKGROUND OF THE INVENTION

1. Field of the Invention

The present invention relates to a location registration area configuring method, a mobile communication system, a base station, and a location information management server and, more particularly, to a location registration area configuring method in a mobile communication system comprised of a plurality of base stations, a plurality of mobile stations, a network to which the base stations are connected, and a location information management server connected to the network (particularly, a method associated with a configuration of location registration areas on the occasion of newly installing a base station and on the occasion of removing a base station), the mobile communication system, and a base station and a location information management server forming the mobile communication system.

The "control data traffic characteristic" in the specification and in the scope of claims refers to a characteristic of traffic of control data for initiation of communication, and the "contents data traffic characteristic" to a characteristic of traffic of contents data between terminals in communication (mobile stations and others).

2. Related Background Art

The second generation cordless telephone system called PHS (Personal Handyphone System) is known (cf. U.S. Pat. No. 5,361,396). This system adopts a location registration area system in which a location registration area for location registration of each mobile station is comprised of cells established by a plurality of base stations. Each mobile station is notified of location registration area information of a group to which it belongs, by broadcast information from a base station, compares the location registration area information thus notified of, with location registration area information about a location registration area where the mobile station itself registers, and performs location registration if the broadcast information is different from the registered information. Since the cells forming each location registration area are of microcell structure of small radius, this system is characterized in that overlaps are large between the individual cells and the size of the location registration areas for location registration of the individual mobile stations is always fixed, regardless of whether traffic variation is great or not at each mobile station.

In the above-stated prior art, a plurality of base stations forming the location registration areas are connected to switching centers by definite physical links, and this can lead to such a case that when a base station is newly installed in the location registration areas or is removed therefrom, it is connected to a switching center different even from that of its adjacent base stations and has a different paging area. This can raise a problem that a mobile station has to perform location registration frequently whenever it transfers between cells established by base stations, and it is thus essential to control the base stations and the location information management server in order to flexibly reconfigure the location registration areas on the occasion of new installation and removal of a base station.

Since the size of the location registration areas is fixed, regardless of whether both or one of the control data traffic characteristic and the contents data traffic characteristic is heavy or not in the individual location registration areas, there arises a problem that paging channels are oppressed to reduce channel efficiency, depending upon frequencies of control data traffic.

The present invention has been accomplished in order to solve the above problems and an object of the invention is to make improvement in the configuration of location registration areas.

SUMMARY OF THE INVENTION

In order to achieve the above object, a location registration area configuring method according to the present invention is a location registration area configuring method in a mobile communication system which comprises a plurality of mobile stations, a plurality of base stations connected to a network, and a location information management server connected to the network and configured to manage location registration areas formed of cells established by the base stations and location information about locations of the mobile stations, and in which each of the base stations is allowed to establish communication with surrounding base stations through radio or wire link, the method comprising: a recognizing step wherein when a base station is newly installed in the mobile communication system, the base station recognizes a location of its own and recognizes state of location registration areas established by surrounding base stations, through communication with the surrounding base stations or through communication with the location information management server; a selecting step wherein the newly installed base station selects a location registration area to which it should belong, based on the location of its own and the state of the location registration areas thus recognized; and a broadcasting step wherein the newly installed base station attaches itself to the location registration area thus selected and notifies the location information management server that the base station is newly installed in the location registration area and wherein the newly installed base station broadcasts a location registration area identifier for identifying the location registration area, to the mobile stations through a broadcast channel.

Namely, the location registration area configuring method described above comprises the recognizing step wherein when a base station is newly installed in the mobile communication system, it recognizes a location of its own and it also recognizes state of location registration areas established by surrounding base stations through communication with the surrounding base stations or through communication with the location information management server, and the selecting step wherein the newly installed base station selects a location registration area to which the base station should belong, based on the location of its own and the state of the location registration areas thus recognized. In the broadcasting step thereafter, the newly installed base station attaches itself to the location registration area thus selected, notifies the location information management server that the base station is newly installed in the location registration area, and broadcasts a location registration area identifier for identifying the location registration area to the mobile stations through a broadcast channel. This permits the location registration areas to be flexibly reconfigured on the occasion of new installation of the base station and also takes account of the state of the location registration areas recognized through communication with the surrounding base stations or through communication with the location information management server, thereby solving the problem that the adjacent base stations belong to different location registration areas.

In order to achieve the above object, another location registration area configuring method according to the present invention is a location registration area configuring method in a mobile communication system which comprises a plurality of mobile stations, a plurality of base stations connected to a network, and a location information management server connected to the network and configured to manage location registration areas formed of cells established by the base stations and location information about locations of the mobile stations, and in which each of the base stations is allowed to establish communication with surrounding base stations through radio or wire link, the method comprising: a recognizing step wherein when a base station is newly installed in the mobile communication system, the base station recognizes a location of its own; a location notifying step wherein the newly installed base station notifies the location information management server of location information about the location of its own; a selecting step wherein the location information management server selects a location registration area to which the newly installed base station should belong, based on state of the location registration areas and the location information thus notified of; an area notifying step wherein the location information management server notifies the newly installed base station of the location registration area thus selected; and a broadcasting step wherein the newly installed base station attaches itself to the location registration area thus notified of and broadcasts a location registration area identifier for identifying the location registration area, to the mobile stations through a broadcast channel.

Namely, the location registration area configuring method as described comprises the recognizing step wherein when a base station is newly installed in the mobile communication system, it recognizes a location of its own and the location notifying step wherein the newly installed base station notifies the location information management server of the location information about the location of its own. In the selecting step thereafter the location information management server selects a location registration area to which the newly installed base station should belong, based on the sate of the location registration areas and the location information thus notified of, and in the area notifying step the location information management server notifies the newly installed base station of the selected location registration area. In the broadcasting step, the newly installed base station, receiving the notification, attaches itself to the location registration area thus notified of, and broadcasts a location registration area identifier for identifying the location registration area, to the mobile stations through a broadcast channel. This permits the location registration areas to be flexibly reconfigured on the occasion of new installation of the base station, as in the case of the aforementioned method, and also permits a location registration area to be selected in consideration of the state of the location registration areas managed by the location information management server, thereby solving the problem that the adjacent base stations belong to different location registration areas.

In order to smoothly manage the information about the newly installed base station, the location registration area configuring method of the two forms as described are more desirably configured to further comprise a registering step wherein the location information management server registers information about the newly installed base station on a registration table for base stations constituting the location registration area.

In this case, the location registration area configuring methods of the two forms described above are more desirably configured to further comprise a removal notifying step wherein when a base station is removed from the mobile communication system, the base station notifies the location information management server that the base station is removed; and a deleting step wherein the location information management server deletes information about the removed base station from a registration table for base stations constituting a location registration area to which the removed base station has belonged. As in this configuration, the location information management server is able to smoothly manage the registration condition of the base stations forming the location registration area, using the registration table for base stations, based on the notification from the base station.

Incidentally, the location registration area configuring methods of the two forms described above are desirably configured to further comprise a measuring step wherein the base station measures a traffic characteristic in a cell established by the base station; a traffic notifying step wherein the base station notifies the location information management server of the traffic characteristic obtained by measurement; and an increasing/decreasing step wherein the location information management server increases or decreases the number of base stations constituting each location registration area so as to average traffics in the respective location registration areas, based on the traffic characteristic thus notified of.

Namely, the base station measures the traffic characteristic in the cell established by the base station in the measuring step and notifies the location information management server of the traffic characteristic obtained by the measurement, in the traffic notifying step. In the increasing/decreasing step, the location information management server, receiving the notification, increases or decreases the number of base stations constituting each location registration area so as to average the traffics in the respective location registration areas, based on the traffic characteristic thus notified of. Since the numbers of base stations in the location registration areas are dynamically changed based on the traffic characteristic as described, this configuration has the effect of averaging the traffics and the effect of optimizing the size of the location registration areas, so as to improve the channel efficiency.

The location registration area configuring methods of the two forms described above are desirably configured to further comprise a measuring step wherein the base station measures a traffic characteristic in a cell established by the base station; an information exchanging step wherein the base station exchanges information about the traffic characteristic through communication with surrounding base stations; and an increasing/decreasing step wherein the number of base stations constituting a location registration area to which the base station belongs is increased or decreased so as to average traffics in respective location registration areas, based on traffic characteristics obtained by exchange.

Namely, the base station measures the traffic characteristic in the cell established by the base station, in the measuring step and exchanges the information about the traffic characteristic through communication with the surrounding base stations in the information exchanging step. In the increasing/decreasing step thereafter, the number of base stations constituting the location registration area to which the base station itself belongs, is increased or decreased so as to average the traffics in the respective location registration areas, based on the traffic characteristic obtained by the exchange. Since the numbers of base stations in the location registration areas are dynamically changed based on the traffic characteristic as described, this configuration has the effect of averaging the traffics and the effect of optimizing the size of the location registration areas, so as to improve the channel efficiency.

The process of increasing or decreasing the number of base stations in the above increasing/decreasing step may be implemented by an operation of a specific base station or by an autonomous operation among a plurality of base stations.

In the location registration area configuring methods of the two forms described above, the measuring step is desirably configured to measure both or one of a control data traffic characteristic and a contents data traffic characteristic, as the traffic characteristic in the cell.

In the location registration area configuring methods of the two forms described above, the location registration areas can be defined as spaces sectioned by latitude and longitude, three-dimensional structures and floors thereof, individual vehicle, individual train, individual ship, or individual airplane.

In the location registration area configuring methods of the two forms described above, the recognizing step is configured so that the base station can recognize the location of its own through communication with a global positioning system (GPS: Global Positioning System) or with surrounding base stations or through communication with the location information management server.

Meanwhile, the aspect of the invention associated with the location registration area configuring methods described above can also be described as an aspect of the invention associated with a mobile communication system, an aspect of the invention associated with a base station, and an aspect of the invention associated with a location information management server as described below. It is noted that these aspects are based on the substantially identical technical concept and provide similar operations and effects.

Namely, in order to achieve the above object, a mobile communication system according to the present invention is a mobile communication system which comprises a plurality of mobile stations, a plurality of base stations connected to a network, and a location information management server connected to the network and configured to manage location registration areas formed of cells established by the base stations and location information about locations of the mobile stations, in which the cells established by the base stations form the location registration areas, and in which each of the base stations is allowed to establish communication with surrounding base stations through radio or wire link, wherein each of the base station comprises: recognizing means for, when the base stations is newly installed in the mobile communication system, recognizing a location of its own, and state of location registration areas established by surrounding base stations, through communication with the surrounding base stations or through communication with the location information management server; selecting means for selecting a location registration area to which the base station should belong, based on the location of its own and the state of the location registration areas thus recognized; and broadcasting means for notifying the location information management server that the base station is newly installed in the location registration area, and for broadcasting a location registration area identifier for identifying the location registration area, to the mobile stations through a broadcast channel.

In order to achieve the above object, another mobile communication system according to the present invention is a mobile communication system which comprises a plurality of mobile stations, a plurality of base stations connected to a network, and a location information management server connected to the network and configured to manage location registration areas formed of cells established by the base stations and location information about locations of the mobile stations, in which the cells established by the base stations form the location registration areas, and in which each of the base stations is allowed to establish communication with surrounding base stations through radio or wire link, wherein each of the base stations comprises: recognizing means for, when the base station is newly installed in the mobile communication system, recognizing a location of its own; location notifying means for notifying the location information management server of location information about the location of its own thus recognized by the recognizing means; and broadcasting means for broadcasting a location registration area identifier for identifying a location registration area notified of by the location information management server, to the mobile stations through a broadcast channel, and wherein the location information management server comprises: selecting means for selecting a location registration area to which the newly installed base station should belong, based on state of the location registration areas and the location information thus notified of; and area notifying means for notifying the newly installed base station of the location registration area selected by the selecting means.

In the mobile communication systems of the two is forms described above, the location information management server is desirably configured to further comprise registering means for registering information about the newly installed base station on a registration table for base stations constituting the location registration area.

The mobile communication systems of the two forms described above are desirably configured so that the base station further comprises removal notifying means for, when the base station is removed from the mobile communication system, notifying the location information management server that the base station is removed and so that the location information management server further comprises deleting means for deleting information about the removed base station from a registration table for base stations constituting a location registration area to which the removed base station has belonged.

The mobile communication systems of the two forms described above are desirably configured so that the base station further comprises: measuring means for measuring a traffic characteristic in a cell established by the base station; and traffic notifying means for notifying the location information management server of the traffic characteristic obtained by measurement by the measuring means and so that the location information management server further comprises: increasing/decreasing means for increasing or decreasing the number of base stations constituting each location registration area so as to average traffics in the respective location registration areas, based on the traffic characteristic thus notified of.

The mobile communication systems of the two forms described above are desirably configured so that the base station comprises: measuring means for measuring a traffic characteristic in a cell established by the base station;

information exchanging means for exchanging information about the traffic characteristic through communication with surrounding base stations; and increasing/decreasing means for increasing or decreasing the number of base stations constituting a location registration area to which the base station belongs, so as to average traffics in the respective location registration areas, based on the traffic characteristic obtained by exchange by the information exchanging means.

In the mobile communication systems of the two forms described above, the measuring means is desirably configured to measure both or one of a control data traffic characteristic and a contents data traffic characteristic, as the traffic characteristic in the cell.

In the mobile communication systems of the two forms described above, the location registration areas are desirably defined as spaces sectioned by latitude and longitude, three-dimensional structures and floors thereof, individual vehicle, individual train, individual ship, or individual airplane.

In the mobile communication systems of the two forms described above, the recognizing means is desirably configured to recognize the location of its own through communication with a global positioning system or with surrounding base stations or through communication with the location information management server.

In order to achieve the above object, a base station according to the present invention is a base station which constitutes a mobile communication system together with a plurality of mobile stations, and a location information management server connected to a network and configured to manage location registration areas formed of cells and location information about locations of the mobile stations, which is connected to the network, and which is allowed to establish communication with surrounding base stations through radio or wire link, a location registration area being formed of cells established by the base station and surrounding base stations, the base station comprising: recognizing means for, when the base station is newly installed in the mobile communication system, recognizing a location of its own, and state of location registration areas established by surrounding base stations, through communication with the surrounding base stations or through communication with the location information management server; selecting means for selecting a location registration area to which the base station should belong, based on the location of its own and the state of the location registration areas thus recognized; and broadcasting means for notifying the location information management server that the base station is newly installed in the location registration area, and for broadcasting a location registration area identifier for identifying the location registration area, to the mobile stations through a broadcast channel.

In order to achieve the above object, another base station according to the present invention is a base station which constitutes a mobile communication system together with a plurality of mobile stations, and a location information management server connected to a network and configured to manage location registration areas formed of cells and location information about locations of the mobile stations, which is connected to the network, and which is allowed to establish communication with surrounding base stations through radio or wire link, a location registration area being formed of cells established by the base station and surrounding base stations, the base station comprising: recognizing means for, when the base station is newly installed in the mobile communication system, recognizing a location of its own; location notifying means for notifying the location information management server of location information about the location of its own thus recognized by the recognizing means; and broadcasting means for broadcasting a location registration area identifier for identifying a location registration area notified of by the location information management server, to the mobile stations through a broadcast channel.

The base stations of the two forms described above are desirably configured to further comprise measuring means for measuring a traffic characteristic in a cell established by the base station; and traffic notifying means for notifying the location information management server of the traffic characteristic obtained by measurement by the measuring means.

The base stations of the two forms described above are desirably configured to further comprise measuring means for measuring a traffic characteristic in a cell established by the base station; information exchanging means for exchanging information about the traffic characteristic through communication with surrounding base stations; and increasing/decreasing means for increasing or decreasing the number of base stations constituting a location registration area to which the base station belongs, so as to average traffics in the respective location registration areas, based on the traffic characteristic obtained by exchange by the information exchanging means.

In the base stations of the two forms described above, the measuring means is desirably configured to measure both or one of a control data traffic characteristic and a contents data traffic characteristic, as the traffic characteristic in the cell.

In the base stations of the two forms described above, the recognizing means is desirably configured to recognize the location of its own through communication with a global positioning system or with surrounding base stations or through communication with the location information management server.

In order to achieve the above object, a location information management server according to the present invention is a location information management server which constitutes a mobile communication system together with a plurality of mobile stations, and a base station connected to a network, allowed to establish communication with surrounding base stations through radio or wire link, and forming a location registration area as an aggregate of cells established by the base station and surrounding base stations, which is connected to the network, and which manages location registration areas formed of cells established by the base stations and location information about locations of the mobile stations, the location information management server comprising: selecting means for, based on state of the location registration areas and on location information notified of by a base station newly installed in the mobile communication system, selecting a location registration area to which the newly installed base station should belong; and area notifying means for notifying the newly installed base station of the location registration area selected by the selecting means.

The location information management server according to the present invention is desirably configured to further comprise registering means for registering information about the newly installed base station on a registration table for base stations constituting the location registration area.

The location information management server according to the present invention is desirably configured to further comprise deleting means for, when a base station removed from the mobile communication system notifies the location information management server that the base station is removed, deleting information about the removed base station from a registration table for base stations constituting a location registration area to which the removed base station has belonged.

The location information management server according to the present invention is desirably configured to further comprise increasing/decreasing means for increasing or decreasing the number of base stations constituting each location registration area so as to average traffics in the respective location registration areas, based on traffic characteristic in a cell notified of by a base station.

DESCRIPTION OF THE PREFERRED EMBODIMENTS

A variety of embodiments of the present invention will be described below.

First Embodiment

The first embodiment describes a form wherein a base station recognizes a location of its own when newly installed in a mobile communication system and selects a location registration area to which the base station itself should belong, through communication with surrounding base stations, and a form wherein a base station measures a traffic of a cell under control of its own and wherein the numbers of base stations in location registration areas are dynamically changed based on the traffic characteristic.

Figure 1:
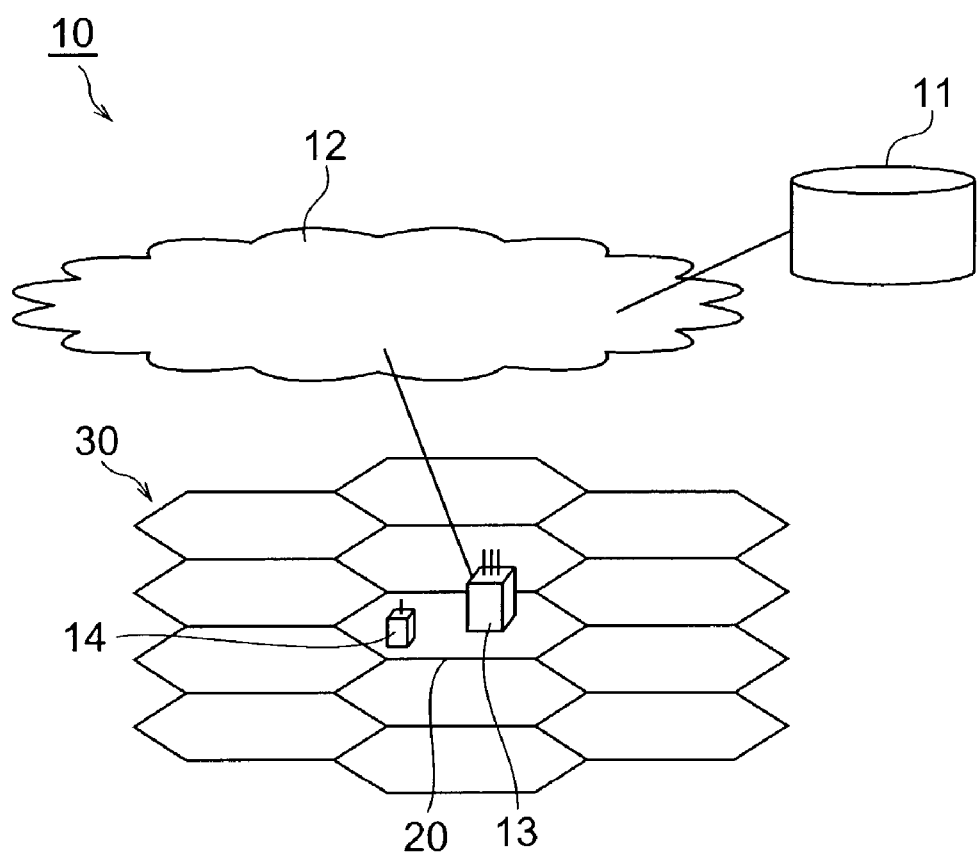
FIG. 1 is a diagram to show the overall configuration of the mobile communication system in the first and second embodiments.

FIG. 1 shows a mobile communication system 10 assumed in the present embodiment. As shown in FIG. 1, the mobile communication system 10 is comprised of a base station 13 connected to a network 12; a mobile station 14 present in a cell 20 established by the base station 13; and a location information management server 11 connected to the network 12 and managing a location registration area 30 formed of cells 20 and location information about the location of the mobile station 14. Although omitted from the illustration in FIG. 1, it is assumed that there exist a plurality of base stations 13 and mobile stations 14. Each base station 13 is allowed to establish communication with surrounding base stations 13 through radio or wire link.

Figure 2:
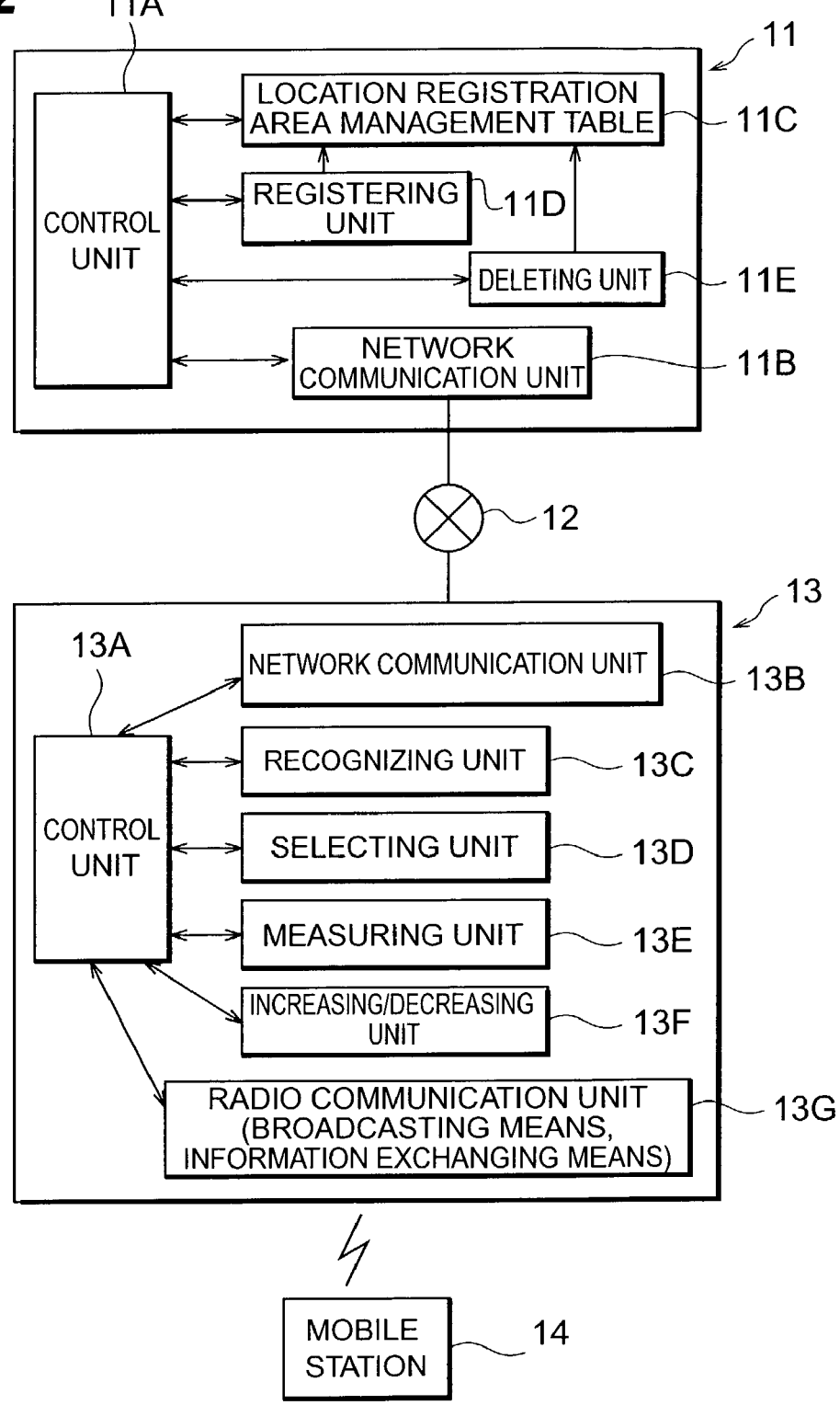
FIG. 2 is a functional block diagram to show the configurations of the respective elements in the mobile communication system of the first embodiment.

Now let us generally describe each of the configurations of the location information management server 11 and the base station 13 with reference to FIG. 2.

As shown in FIG. 2, the location information management server 11 is comprised of a location registration area management table 11C in which registration information about base stations 13 constituting each location registration area 30 is recorded for every location registration area; a registration unit 11D which registers information about a newly installed base station 13 on the location registration area management table 11C; a deleting unit 11E which deletes information about a removed base station 13 from the location registration area management table 11C; a network communication unit 11B which performs transmission/reception of information to or from each base station 13 through the network 12; and a control unit 11A which monitors and controls the operations of the respective units described above.

The base station 13 is comprised of a network communication unit 13B which establishes communication with the location information management server 11 through the network 12 and notifies the location information management server 11 that the base station itself is newly installed in the location registration area 30; a recognizing unit 13C which, when the base station itself is newly installed in the mobile communication system 10, recognizes the location of its own, and state of location registration areas 30 established by surrounding base stations 13, through communication with the surrounding base stations 13 or through communication with the location information management server 11; a selecting unit 13D which selects a location registration area 30 to which the base station itself should belong, based on the location of its own and the state of the location registration areas 30 thus recognized; a measuring unit 13E which measures the traffic characteristic in the cell 20 established by itself; an increasing/decreasing unit 13F which increases or decreases the number of base stations 13 constituting the location registration area 30 to which the base station itself belongs, so as to average traffics in the respective location registration areas 30, based on the traffic characteristic obtained by exchange at information exchanging means; a radio communication unit 13G which establishes communication through radio link with the mobile station 14 or with other base stations 13, which broadcasts a location registration area identifier for identifying the location registration area 30 where the base station itself is newly installed, to the mobile station 14 through a broadcast channel, and which exchanges information about the traffic characteristic through communication with surrounding base stations 13; and a control unit 13A which monitors and controls the operations of the respective units described above.

The measuring unit 13E measures both or one of the control data traffic characteristic and the contents data traffic characteristic, as the traffic characteristic in the cell 20. The recognizing unit 13C recognizes the location of the base station of its own through communication or the like with GPS or with a plurality of surrounding base stations 13Q.

The location registration areas can be defined as spaces sectioned by latitude and longitude, three-dimensional structures and floors thereof, individual vehicle, individual train, individual ship, or individual airplane.

Figure 3:
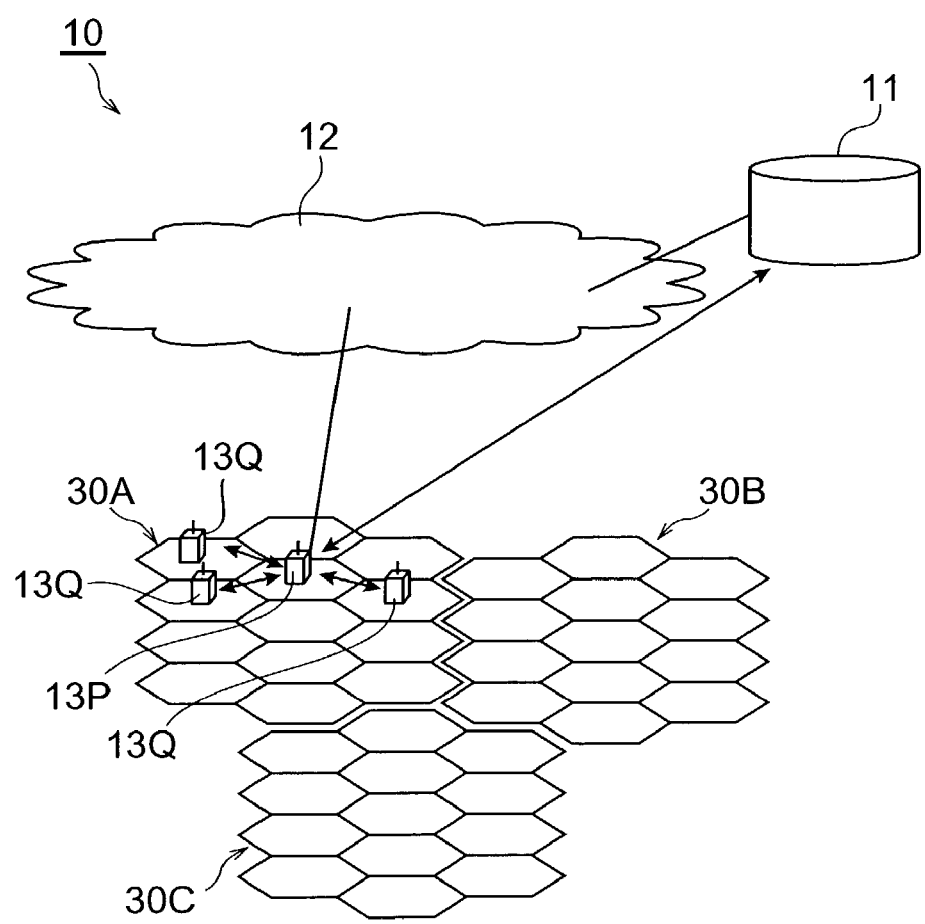
FIG. 3 is a diagram for explaining the location registration area configuring method on the occasion of new installation of a base station in the first and second embodiments.

The following will describe a method of selecting a location registration area on the occasion of new installation of a base station, which is carried out by the base station, with reference to FIG. 3. The location registration areas will be denoted below so that "location registration area 30" will be used as a generic name of a plurality of location registration areas and so that specific location registration areas will be referred to as "location registration areas 30A, 30B" or the like.

Let us assume that a base station 13P is newly installed in a location registration area 30A in FIG. 3. In this newly installed base station 13P, the recognizing unit 13C (FIG. 2) recognizes a location of its own through communication or the like with GPS or with a plurality of surrounding base stations 13Q. Then the base station 13P communicates with surrounding base stations 13Q to capture the status of surrounding location registration areas, and recognizes the location registration area 30A to which the base station itself should belong, based on the status of surrounding location registration areas and the location of its own.

If the newly installed base station 13P is located near boundaries among location registration areas 30A, 30B, and 30C and if the surrounding base stations 13Q belong to a plurality of location registration areas 30, the location registration area 30 may be selected as follows: the location registration area 30 to which the base station 13P should belong is selected so as to average the control data traffics in the respective location registration areas 30; the location registration area 30 with the smallest number of base stations belonging thereto at the time of selection is selected so as to average the numbers of base stations in the respective location registration areas 30; or the location registration area 30 may be selected by a selecting means other than these.

Then the newly installed base station 13P attaches itself to the location registration area 30A thus selected, also broadcasts a location registration area identifier of its belonging location registration area 30A to the mobile station 14 (FIG. 2) locating in the cell established by the base station 13P, and starts provision of service to the mobile station 14.

The means for the base station 13P to recognize the location of its own may be communication with the location information management server 11, as well as the communication with GPS or with the surrounding base stations.

Figure 4:
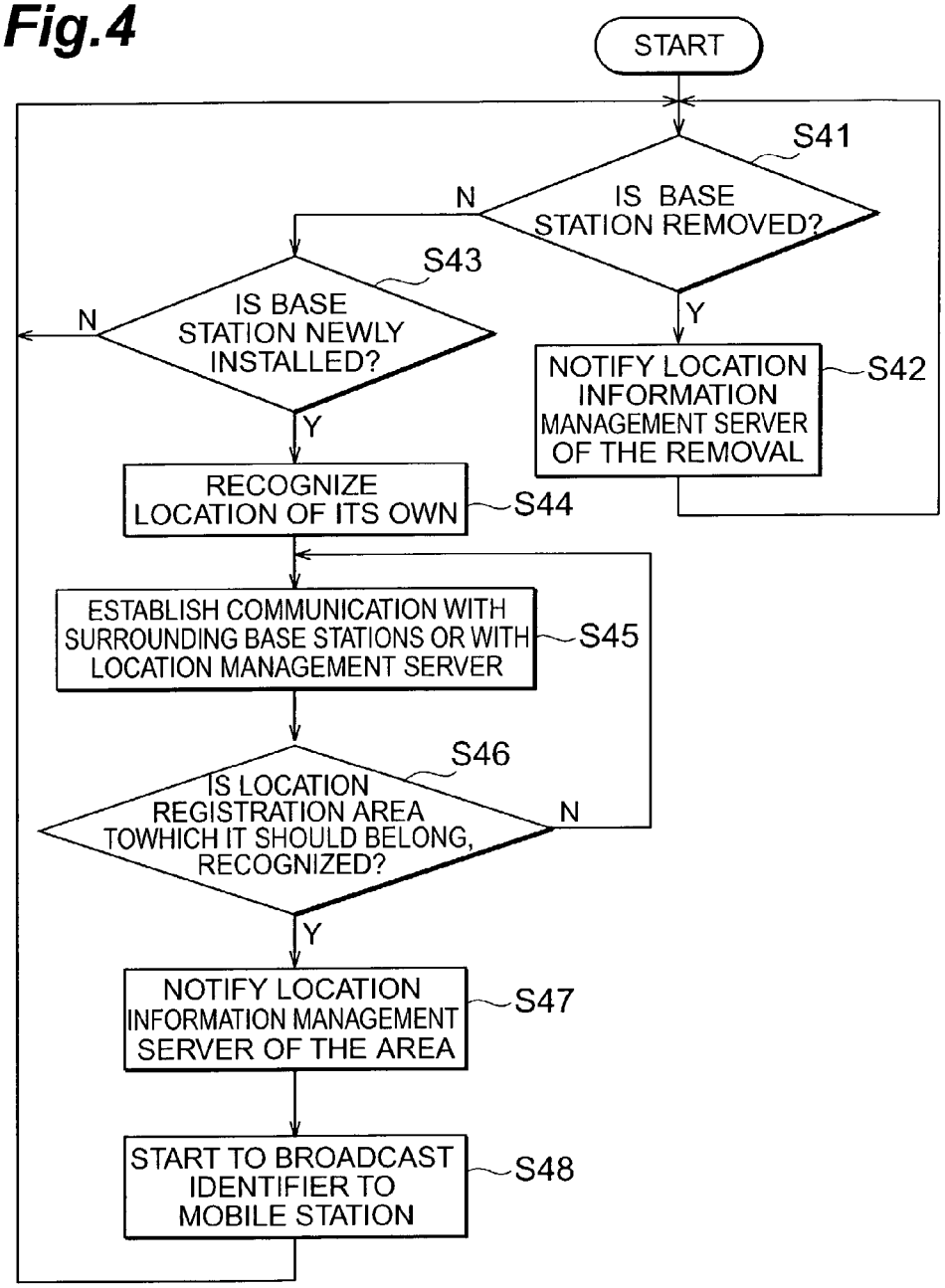
FIG. 4 is a flowchart to show the processing carried out in the base station on the occasion of new installation of a base station in the first embodiment.

The following will describe the processing executed in the base station 13P with reference to FIG. 4. First, the base station 13P determines whether it is a base station scheduled to be removed (S41) and determines whether it is a base station scheduled to be newly installed (S43). If it is a base station scheduled to be removed (yes at S41), the base station 13P notifies the location information management server 11 that it is to be removed (S42). If the base station 13P is a base station scheduled to be newly installed (yes at S43) on the other hand, the base station 13P lets the recognizing unit 13C (FIG. 2) recognize the location of its own through communication with GPS or with a plurality of surrounding base stations 13Q (S44). Then the base station 13P communicates with the surrounding base stations 13Q or the location information management server 11 to recognize the state of location registration area 30 established by the surrounding base stations 13Q (S45), and recognizes (or selects) a location registration area to which the base station itself should belong, based on the location information and the state of location registration area 30 obtained in these recognition steps (S46). Furthermore, the base station 13P notifies the location information management server 11 of the selected location registration area (S47), and it broadcasts a location registration area identifier thereof to the mobile station 14 (FIG. 2) locating under control of the newly installed base station 13P, so as to notify that the base station 13P is newly installed, and starts the service (S48).

Figure 5:
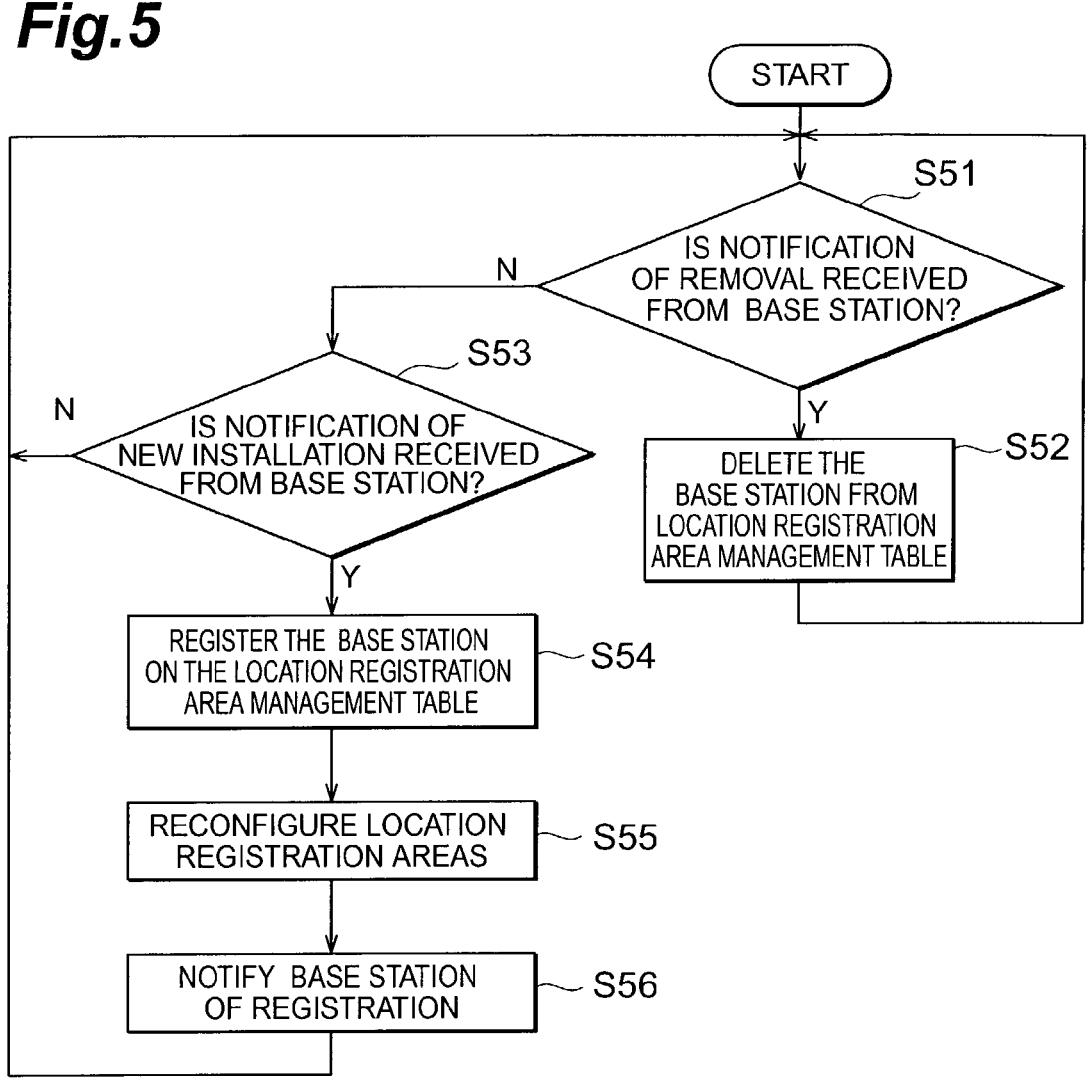
FIG. 5 is a flowchart to show the processing carried out in the location information management server on the occasion of new installation of a base station in the first embodiment.

The following will describe the processing executed in the location information management server 11 in conjunction with the above processing of FIG. 4, referring to FIG. 5. First, the location information management server 11 determines whether a notification of removal is received from the base station 13 (S51) and determines whether a notification of new installation is received from the base station 13 (S53). If a notification of removal is received from the base station 13 (yes at S51), the location information management server 11 deletes information about the base station scheduled to be removed, from the location registration area management table 11C (FIG. 2) of its own (S52), and reconfigures the location registration areas. On the other hand, if a notification of new installation is received from the base station 13 (the base station 13P herein) (yes at S53), the location information management server 11 registers information about the newly installed base station 13P in the information about the location registration area notified of by the base station 13P, on the location registration area management table 11C (S54), changes the number of base stations 13 in the location registration area to reconfigure the location registration areas (S55), and notifies the base station 13 that it is registered (S56).

By the processing in the new installation of the base station 13P described above, it is feasible to flexibly reconfigure the location registration areas on the occasion of the base station 13P being newly installed. Since the state of location registration areas recognized through the communication with the surrounding base stations 13Q is also taken into account in the selection of the location registration area, it solves the problem that adjacent base stations belong to different location registration areas.

Figure 6:
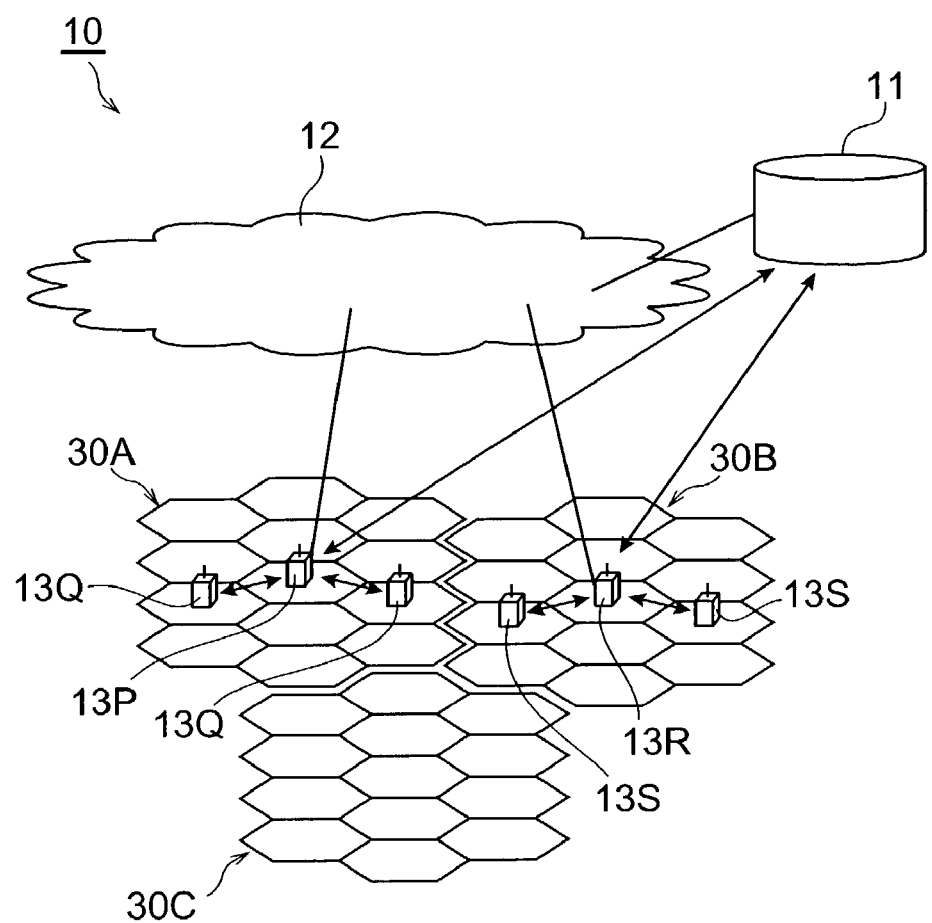
FIG. 6 is a diagram for explaining the method of reconfiguring the location registration areas in the first and second embodiments.
Figure 7:
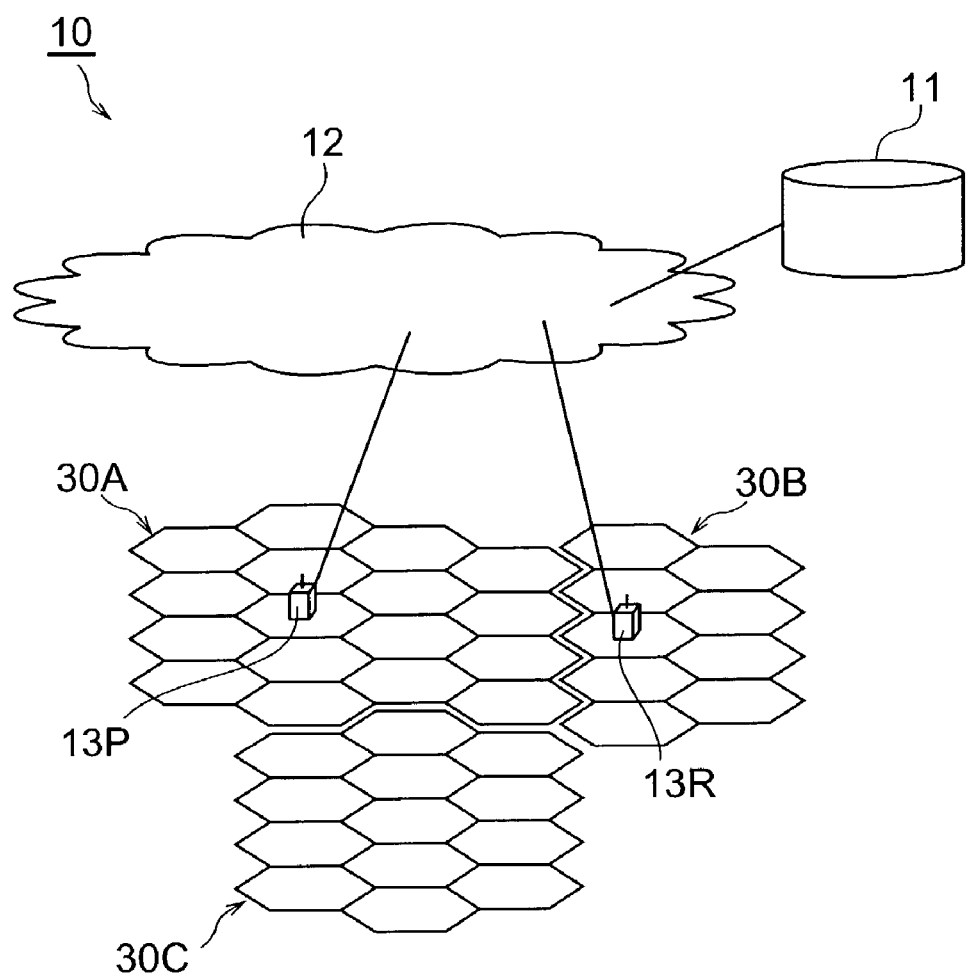
FIG. 7 is a diagram to show the state after the reconfiguration in FIG. 6.

The following will describe a method of reconfiguring the location registration areas, which is carried out by the base station 13, on the basis of FIGS. 6 and 7. As shown in FIG. 6, there exist location registration areas 30A, 30B, and 30C of fixed size. The base station 13P in the location registration area 30A periodically or continuously measures the control data traffic to itself and contents data traffic (which will be generally referred to hereinafter as traffic) and shares the traffic information about the base stations 13P, 13Q, 13R, and 13S through direct communication with a plurality of surrounding base stations 13Q, 13R (wherein the base station 13R establishes communication with a plurality of surrounding base stations 13S). Then the base station 13P changes the number of base stations 13 constituting the location registration area 30, based on the shared traffic information.

Let us suppose herein that the result of the measurement of traffic is that the traffic volume is low in the location registration area 30A and the traffic volume is high in the location registration area 30B, 30C. In this case, in order to average the traffic volumes in the respective location registration areas 30, the area configuration is reconfigured so that some of the base stations in the location registration area 30B, 30C are transferred into the location registration area 30A.

For example, in the case where the base stations having the distance of not less than a fixed value from the center base station (e.g., the base station 13R) in the location registration area 30B, 30C are transferred into the location registration area 30A (i.e., where the location registration area 30A is expanded), while avoiding a scattered configuration in the boundary region of the expanded location registration area 30A, one base station or two or more base stations are selected with preference to those with large contents data traffic out of the base stations in the location registration area 30B, 30C and the base station or base stations thus selected are transferred into the location registration area 30A. This makes it feasible to configure the optimal location registration areas 30A, 30B, 30C in consideration of the traffic characteristics as shown in FIG. 7.

The traffic may be determined by making reference to both of the control data traffic and the contents data traffic as described above, or by measuring only the control data traffic and making reference thereto, or by measuring only the contents data traffic and making reference thereto.

Figure 8:
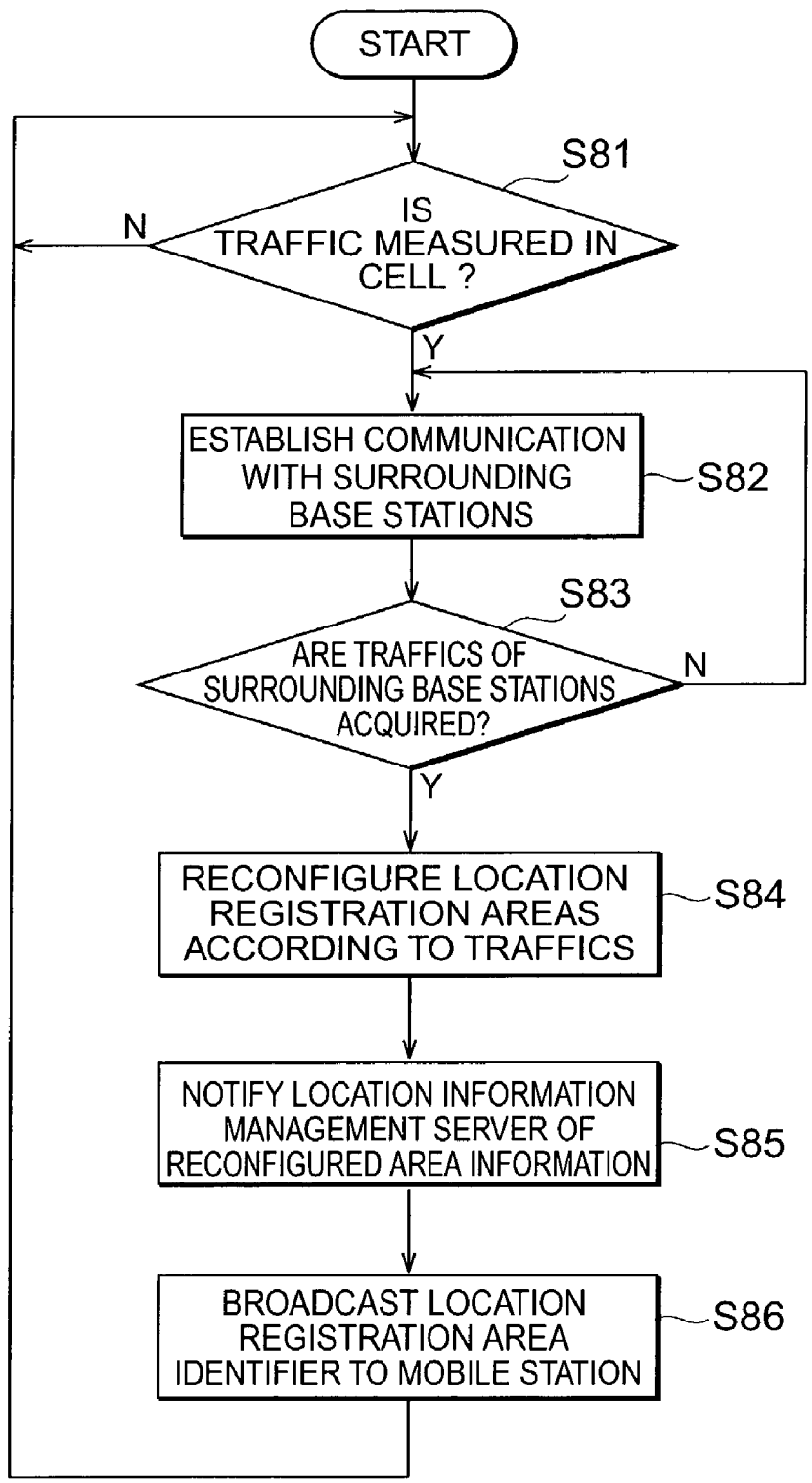
FIG. 8 is a flowchart to show the processing carried out in the base station on the occasion of the reconfiguration of location registration areas in the first embodiment.

The following will describe the processing executed in the base station 13P with reference to FIG. 8. First, the base station 13P measures the traffic in the cell under control of its own (S81), establishes the communication with surrounding base stations 13Q, 13R as to the traffic information obtained by the measurement (S82), and thereby acquires the traffic information about the surrounding base stations 13Q, 13R, 13S (S83).

Then the base station 13P changes the number of base stations 13 constituting the location registration area 30 while preferentially selecting the base stations with large traffic according to the traffic information, as described previously on the basis of FIGS. 6 and 7; whereby the location registration area 30 is reconfigured (S84).

Furthermore, the base station 13P notifies the location information management server 11 of the information about the location registration area 30 after the reconfiguration (S85), and broadcasts a location registration area identifier thereof to the mobile station 14 under control through a broadcast channel (S86).

Since the numbers of base stations in the location registration areas are dynamically changed based on the traffic characteristics by the process of reconfiguring the location registration areas in the base station as described above, the present embodiment provides the effect of averaging traffics and the effect of optimizing the sizes of the location registration areas, so as to increase the channel efficiency.

The process of increasing or decreasing the number of base stations at above S84 may be implemented by an operation of a specific base station (e.g., a newly installed base station, a base station as a master station, or the like), or by an autonomous operation among a plurality of base stations.

Second Embodiment

The second embodiment will describe a form wherein when a base station is newly installed in the mobile communication system, the location information management server selects a location registration area to which the newly installed base station should belong, based on the location information from the newly installed base station and the status of location registration areas, and a form wherein the location information management server dynamically changes the numbers of base stations in the location registration areas on the basis of the traffic characteristic information from each base station.

In the second embodiment the configuration of the mobile communication system 10 shown in FIG. 1 is much the same as in the first embodiment. However, the configurations of the location information management server 11 and the base station 13 are different in part from those in the first embodiment (FIG. 2), and thus differences of the configurations will be described referring to FIG. 9.

Figure 9:
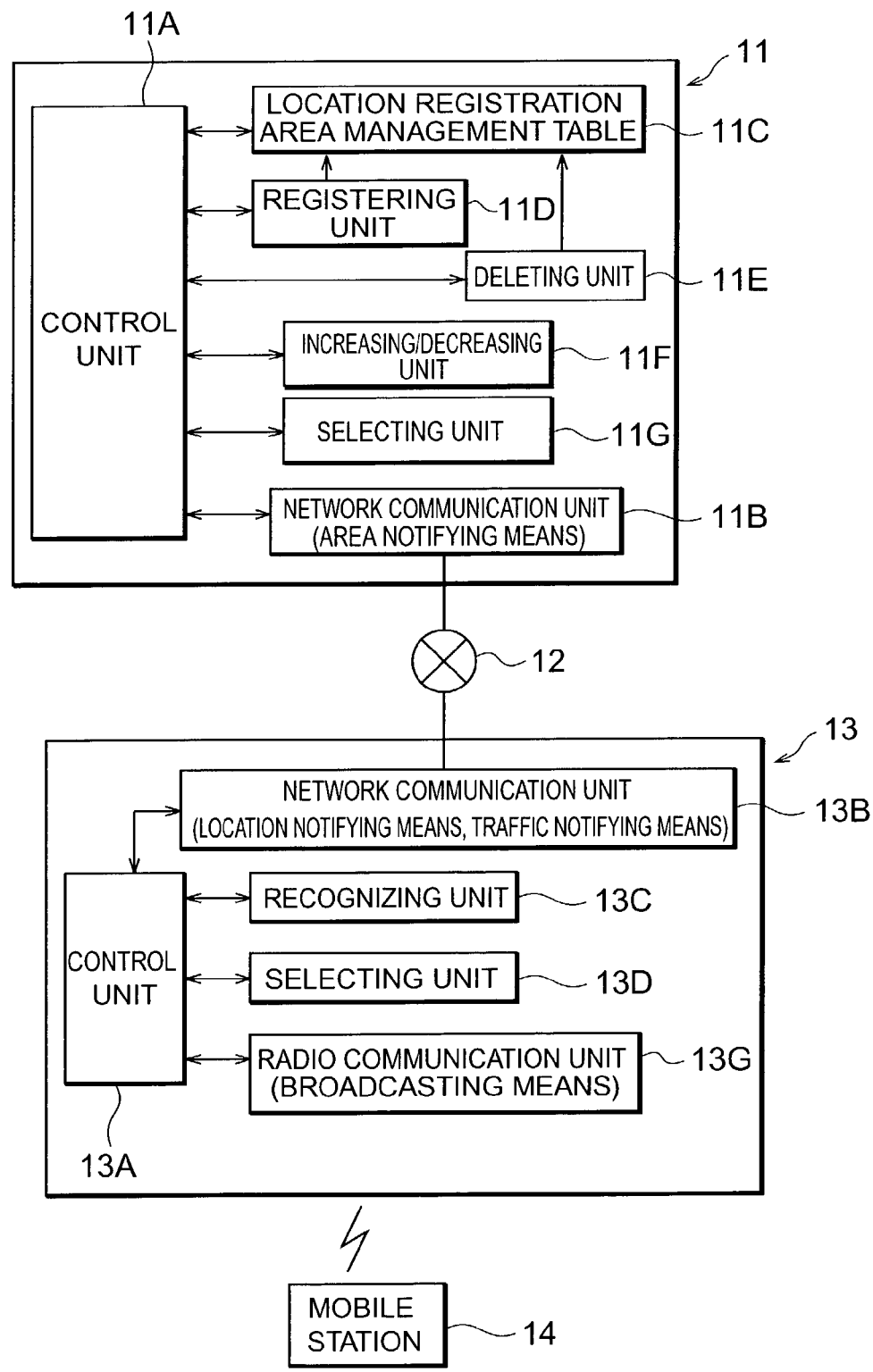
FIG. 9 is a functional block diagram to show the configurations of the respective elements in the mobile communication system of the second embodiment.

The location information management server 11 of FIG. 9 is further provided with a selecting unit 11G which, based on the state of location registration areas 30 and the location information notified of by a newly installed base station 30, selects a location registration area 30 to which the newly installed base station 13 should belong; and an increasing/decreasing unit 11F which increases or decreases the number of base stations 13 constituting each location registration area 30, so as to average the traffics in the respective location registration areas 30, based on traffic characteristics notified of by the respective base stations 13; and the network communication unit 11B also has a function as an area notifying means of notifying the newly installed base station 13 of the selected location registration area 30.

The selecting unit 13D and the increasing/decreasing unit 13F in FIG. 2 become dispensable in the base station 13, and the network communication unit 13B also functions as a location notifying means of notifying the location information management server 11 of the location information of its own station recognized and as a traffic notifying means of notifying the location information management server 11 of the traffic characteristic obtained by measurement. The radio communication unit 13G functions as a broadcasting means of broadcasting the mobile station 14 of a location registration area identifier for identifying the location registration area 30 notified of by the location information management server 11, through a broadcast channel.

The following will describe a method of selecting a location registration area on the occasion of new installation of a base station, which is carried out by the location information management server 11, with reference to FIG. 3.

Let us suppose that the base station 13P is newly installed in the location registration area 30A in FIG. 3. In this newly installed base station 13P, the recognizing unit 13C (FIG. 2) recognizes the location of its own through communication or the like with GPS or with a plurality of surrounding base stations 13Q. Then the base station 13P notifies the location information management server 11 of the location information obtained by the recognition. The location information management server 11 captures the status of surrounding location registration areas with reference to the location registration area management table 11C on the basis of the location information, selects a location registration area 30A to which the newly installed base station 13P should belong, based on the status of surrounding location registration areas and the location of the newly installed base station 13P, and notifies the base station 13P of the selected area.

If the newly installed base station 13P is located near boundaries among location registration areas 30A, 30B, and 30C and if the surrounding base stations 13Q belong to a plurality of location registration areas 30, the location registration area 30 may be selected as follows: the location registration area 30 to which the base station 13P should belong is selected so as to average the control data traffics in the respective location registration areas 30; or the location registration area 30 with the smallest number of base stations belonging thereto at the time of selection is selected so as to average the numbers of base stations in the respective location registration areas 30; or the location registration area 30 may be selected by a selecting means other than these.

Then the newly installed base station 13P, receiving the notification, attaches itself to the location registration area 30A thus selected, also broadcasts a location registration area identifier of its belonging location registration area 30A to the mobile station 14 (FIG. 9) locating in the cell established by the base station 13P, and starts provision of service to the mobile station 14.

The means for recognizing the location of its own in the base station 13P may be communication with the location information management server 11, as well as the communication with GPS or with the surrounding base stations.

Figure 10:
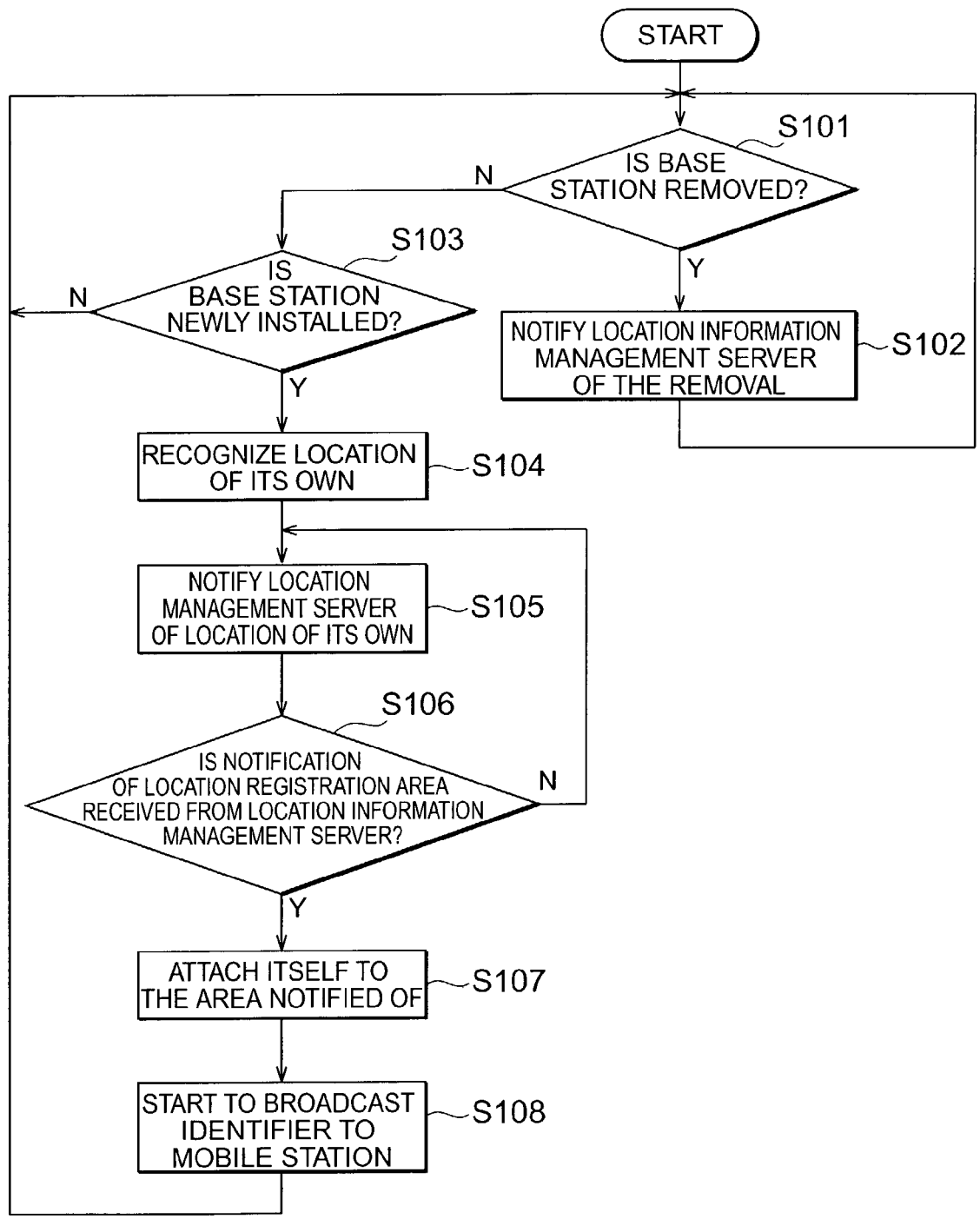
FIG. 10 is a flowchart to show the processing carried out in the base station on the occasion of new installation of a base station in the second embodiment.

The following will describe the processing executed in the base station 13P with reference to FIG. 10. First, the base station 13P determines whether it is a base station scheduled to be removed (S101) and determines whether it is a base station scheduled to be newly installed (S103). If it is a base station scheduled to be removed (yes at S101), the base station 13P notifies the location information management server 11 that it is to be removed (S102). If the base station 13P is a base station scheduled to be newly installed (yes at S103) on the other hand, the base station 13P lets the recognizing unit 13C (FIG. 9) recognize the location of its own, for example, through communication with GPS or with a plurality of surrounding base stations 13Q (S104). Then the base station notifies the location information management server 11 of the location information obtained in the recognition step (S105) and awaits a notification of a location registration area from the location information management server 11 (S106).

When receiving a notification of a location registration area to which the base station itself should belong, which is selected by the processing in the location information management server 11 described later, the base station 13P registers itself in the location registration area thus notified of to attach itself thereto (S107), and then it broadcasts a location registration area identifier thereof through a broadcast channel to the mobile station 14 locating under control of the newly installed base station 13P, so as to notify that the base station 13P is newly installed, and starts the service (S108).

Figure 11:
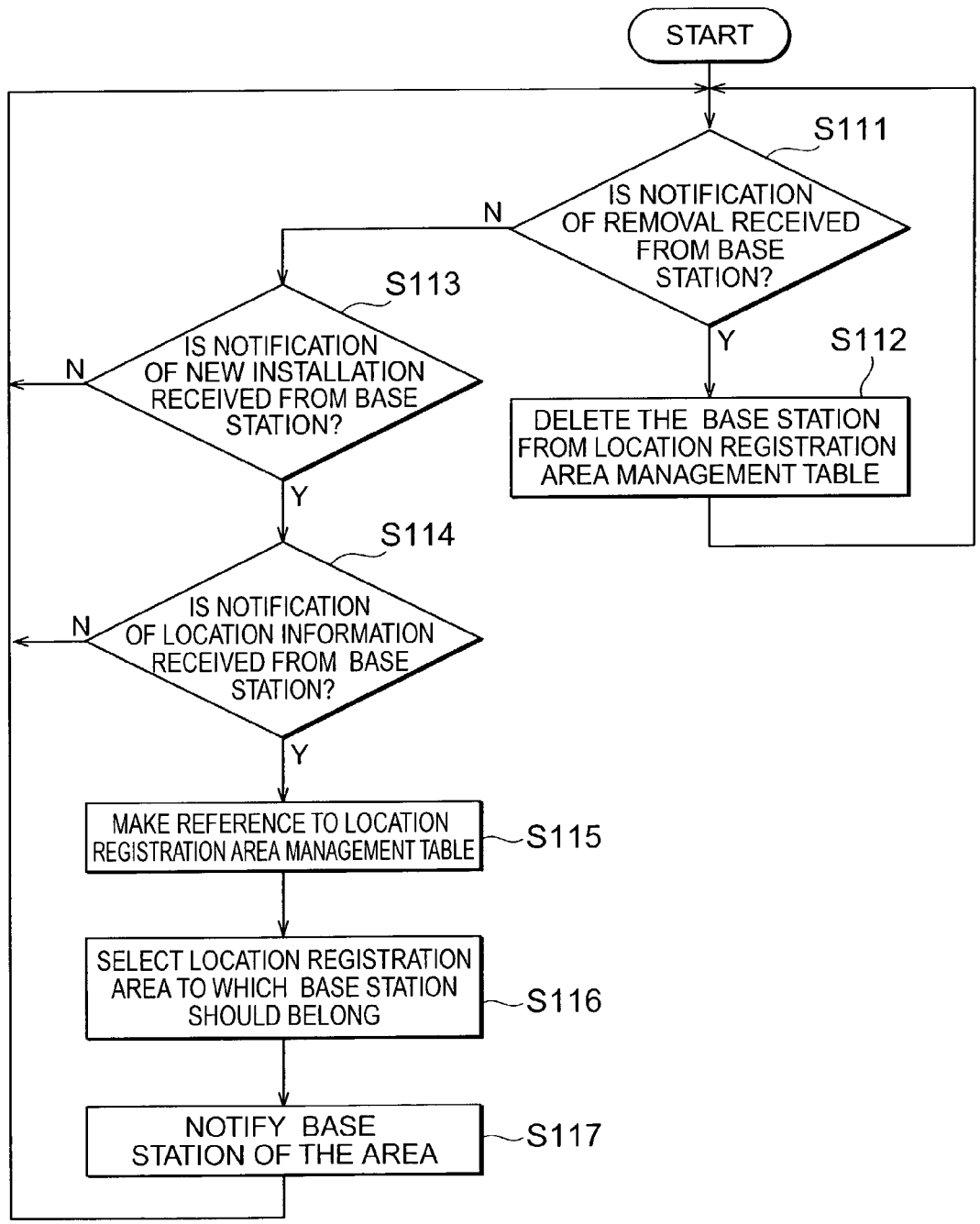
FIG. 11 is a flowchart to show the processing carried out in the location information management server on the occasion of new installation of a base station in the second embodiment.

The following will describe the processing executed in the location information management server 11 in conjunction with the above processing of FIG. 10, referring to FIG. 11. First, the location information management server 11 determines whether a notification of removal is received from the base station 13P (S111) and determines whether a notification of new installation is received from the base station 13P (S113). If a notification of removal is received from the base station 13P (yes at S111), the location information management server 11 deletes information about the base station 13P scheduled to be removed, from the location registration area management table 11C (FIG. 9) of its own (S112), so as to reconfigure the location registration areas. On the other hand, if a notification of new installation is received from the base station 13P (yes at S113), the location information management server 11 then awaits a notification of location information from the base station 13P (S114).

When the location information management server 11 then receives a notification of location information from the base station 13P (yes at S114), it makes reference to the location registration area management table 11C on the basis of the location information of the base station 13P notified of (S115), selects a location registration area to which the newly installed base station 13P should belong, based on the registration information on the location registration area management table 11C and the location information about the newly installed base station 13P (S116), and notifies the base station 13P of the selected location registration area (S117).

By the selecting process at the location information management server 11 on the occasion of new installation of the base station 13P as described above, it is feasible to flexibly reconfigure the location registration areas on the occasion of the base station 13P being newly installed. By the selection of the location registration area taking account of the state of location registration areas managed at the location information management server 11, it solves the problem that adjacent base stations belong to different location registration areas.

The following will describe a method of reconfiguring the location registration areas, which is carried out by the location information management server 11, on the basis of FIGS. 6 and 7. As shown in FIG. 6, there exist location registration areas 30A, 30B, and 30C of fixed size. The base station 13P in the location registration area 30A periodically or continuously measures the control data traffic to itself and contents data traffic (generally referred to hereinafter as traffic), and notifies the location information management server 11 of the result of the measurement. The location information management server 11 changes the number of base stations 13 constituting the location registration area 30, based on the traffic characteristic thus notified of, and updates the location registration area management table 11C.

Let us suppose herein that the result of the measurement of traffic is that the traffic volume is low in the location registration area 30A and the traffic volume is high in the location registration area 30B, 30C. In this case, in order to average the traffic volumes in the respective location registration areas 30, the area configuration is reconfigured so that some of the base stations in the location registration area 30B, 30C are transferred into the location registration area 30A.

For example, in the case where the base stations having the distance of not less than a fixed value from the center base station (e.g., the base station 13R) in the location registration area 30B, 30C are transferred into the location registration area 30A (i.e., where the location registration area 30A is expanded), while avoiding a scattered configuration in the boundary region of the expanded location registration area 30A, one base station or two or more base stations are selected with preference to those with large contents data traffic out of the base stations in the location registration area 30B, 30C and the base station or base stations thus selected are transferred into the location registration area 30A. This makes it feasible to configure the optimal location registration areas 30A, 30B, 30C in consideration of the traffic characteristics as shown in FIG. 7.

The traffic may be determined by making reference to both of the control data traffic and the contents data traffic as described above, or by measuring only the control data traffic and making reference thereto, or by measuring only the contents data traffic and making reference thereto, as in the case of the first embodiment.

Figure 12:
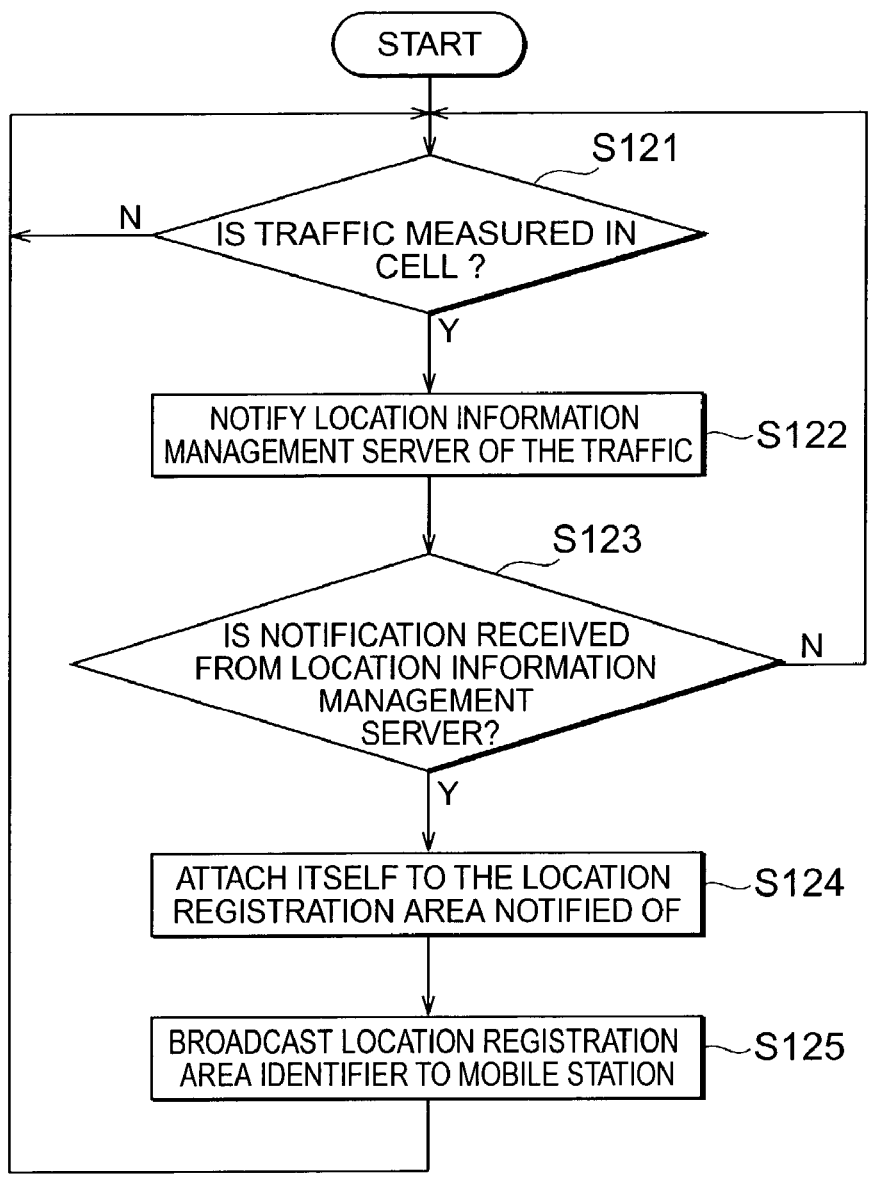
FIG. 12 is a flowchart to show the processing carried out in the base station on the occasion of the reconfiguration of location registration areas in the second embodiment.

The following will describe the processing executed in the base station 13P with reference to FIG. 12. First, the base station 13P measures the traffic in the cell under control thereof (S121) and notifies the location information management server 11 of the traffic information obtained by the measurement (S122). Then the base station 13P awaits a notification of a location registration area from the location information management server 11 (S123).

When the base station 13P receives a notification of a location registration area to which the base station 13P should belong (yes at S123), as a result of a reconfiguration at the location information management server 11 as described later, it registers itself in the location registration area thus notified of and attaches itself thereto (S124), broadcasts through a broadcast channel a location registration area identifier of the area to the mobile station 14 locating under control of the base station 13P, so as to notify that the base station 13P is newly installed, and starts the service to the mobile station 14 (S125).

Figure 13:
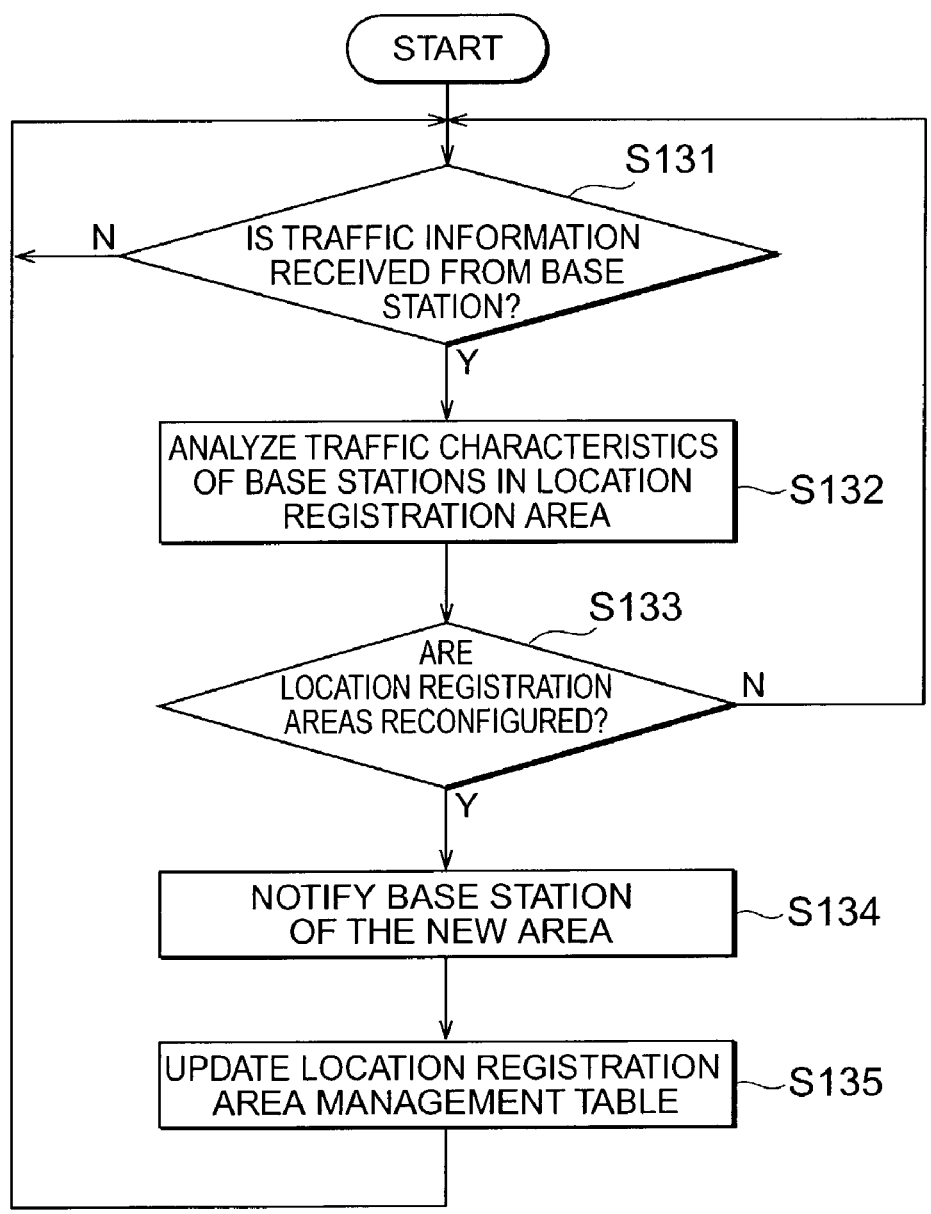
FIG. 13 is a flowchart to show the processing carried out in the location information management server on the occasion of the reconfiguration of location registration areas in the second embodiment.

The following will describe the processing executed in the location information management server 11 in conjunction with the above processing of FIG. 12, with reference to FIG. 13. First, the location information management server 11 awaits a notification of traffic information from the base station 13P (S131). When receiving the notification, the location information management server 11 analyzes the traffic characteristic in the location registration area (S132).

Then the location information management server 11 changes the number of base stations 13 constituting the location registration area 30 while preferentially selecting the base stations with large traffic according to the traffic information, as described previously on the basis of FIGS. 6 and 7; whereby the location registration areas 30 are reconfigured (S133).

Furthermore, the location information management server 11 notifies the base station 13 in the location registration area 30 after the reconfiguration, of a location registration area identifier of the new location registration area 30 (S134), and updates the location registration area management table 11C (S135).

Since the numbers of base stations in the location registration areas are dynamically changed based on the traffic characteristic by the process of reconfiguring the location registration areas in the location information management server 11 as described above, the present embodiment provides the effect of averaging the traffics and the effect of optimizing the sizes of the location registration areas, so as to improve the channel efficiency.

As described above, the present invention makes it feasible to flexibly reconfigure the location registration areas on the occasion of a base station being newly installed and to circumvent the problem that adjacent base stations belong to different location registration areas.

The present invention provides the effect of averaging the traffics and the effect of optimizing the sizes of the location registration areas, so as to improve the channel efficiency, because the numbers of base stations in the location registration areas are dynamically changed based on the traffic characteristic.

What is claimed is:

1. A location registration area configuring method in a mobile communication system which comprises a plurality of mobile stations, a plurality of base stations connected to a network, and a location information management server connected to the network and configured to manage location registration areas formed of cells established by the base stations and location information about locations of the mobile stations, and in which each of said base stations is allowed to establish communication with surrounding base stations through radio or wire link, said method comprising:

a recognizing step wherein when a base station is newly installed in the mobile communication system, said base station recognizes a location of its own and recognizes state of location registration areas established by surrounding base stations, through communication with the surrounding base stations or through communication with the location information management server;

a selecting step wherein said newly installed base station selects a location registration area to which it should belong, based on the location of its own and the state of the location registration areas thus recognized; and a broadcasting step wherein the newly installed base station attaches itself to the location registration area thus selected and notifies the location information management server that the base station is newly installed in the location registration area and wherein the newly installed base station broadcasts a location registration area identifier for identifying the location registration area, to said mobile stations through a broadcast channel.

2. The location registration area configuring method according to claim 1, further comprising a registering step wherein the location information management server registers information about the newly installed base station on a registration table for base stations constituting said location registration area.

3. The location registration area configuring method according to claim 2, further comprising:

a removal notifying step wherein when a base station is removed from the mobile communication system, said base station notifies the location information management server that the base station is removed; and a deleting step wherein the location information management server deletes information about the removed base station from a registration table for base stations constituting a location registration area to which the removed base station has belonged.

4. The location registration area configuring method according to claim 1, further comprising:

a measuring step wherein said base station measures a traffic characteristic in a cell established by the base station;

a traffic notifying step wherein said base station notifies the location information management server of the traffic characteristic obtained by measurement; and an increasing/decreasing step wherein the location information management server increases or decreases the number of base stations constituting each location registration area so as to average traffics in the respective location registration areas, based on the traffic characteristic thus notified of.

5. The location registration area configuring method according to claim 4, wherein the measuring step is configured to measure both or one of a control data traffic characteristic and a contents data traffic characteristic, as the traffic characteristic in the cell.

6. The location registration area configuring method according to claim 1, further comprising:

a measuring step wherein said base station measures a traffic characteristic in a cell established by the base station;

an information exchanging step wherein said base station exchanges information about the traffic characteristic through communication with surrounding base stations; and an increasing/decreasing step wherein the number of base stations constituting a location registration area to which the base station belongs is increased or decreased so as to average traffics in respective location registration areas, based on traffic characteristics obtained by exchange.

7. The location registration area configuring method according to claim 6, wherein he measuring step is configured to measure both or one of a control data traffic characteristic and a contents data traffic characteristic, as the traffic characteristic in the cell.

8. The location registration area configuring method according to claim 1, wherein the location registration areas are defined as spaces sectioned by latitude and longitude, three-dimensional structures and floors thereof, individual vehicle, individual train, individual ship, or individual airplane.

9. The location registration area configuring method according to claim 1, wherein the recognizing step is configured so that said base station recognizes the location of its own through communication with a global positioning system or with surrounding base stations or through communication with the location information management server.

10. A mobile communication system which comprises a plurality of mobile stations, a plurality of base stations connected to a network, and a location information management server connected to the network and configured to manage location registration areas formed of cells established by the base stations and location information about locations of the mobile stations, in which the cells established by the base stations form the location registration areas, and in which each of said base stations is allowed to establish communication with surrounding base stations through radio or wire link, wherein each of said base stations comprises:

recognizing means for, when the base station is newly installed in the mobile communication system, recognizing a location of its own, and state of location registration areas established by surrounding base stations, through communication with the surrounding base stations or through communication with the location information management server;

selecting means for selecting a location registration area to which the base station should belong, based on the location of its own and the state of the location registration areas thus recognized; and broadcasting means for notifying the location information management server that the base station is newly installed in the location registration area, and for broadcasting a location registration area identifier for identifying the location registration area, to the mobile stations through a broadcast channel.

11. The mobile communication system according to claim 10, wherein the location information management server further comprises registering means for registering information about the newly installed base station on a registration table for base stations constituting the location registration area.

12. The mobile communication system according to claim 11, wherein said base station further comprises removal notifying means for, when the base station is removed from the mobile communication system, notifying the location information management server that the base station is removed, and wherein said location information management server further comprises deleting means for deleting information about the removed base station from a registration table for base stations constituting a location registration area to which the removed base station has belonged.

13. The mobile communication system according to claim 10, wherein said base station further comprises:

measuring means for measuring a traffic characteristic in a cell established by the base station; and traffic notifying means for notifying the location information management server of the traffic characteristic obtained by measurement by the measuring means, and wherein said location information management server further comprises:

increasing/decreasing means for increasing or decreasing the number of base stations constituting each location registration area so as to average traffics in the respective location registration areas, based on the traffic characteristic thus notified of.

14. The mobile communication system according to claim 13, wherein the measuring means is configured to measure both or one of a control data traffic characteristic and a contents data traffic characteristic, as the traffic characteristic in the cell.

15. The mobile communication system according to claim 10, wherein said base station comprises:

measuring means for measuring a traffic characteristic in a cell established by the base station;

information exchanging means for exchanging information about the traffic characteristic through communication with surrounding base stations; and increasing/decreasing means for increasing or decreasing the number of base stations constituting a location registration area to which the base station belongs, so as to average traffics in the respective location registration areas, based on the traffic characteristic obtained by exchange by the information exchanging means.

16. The mobile communication system according to claim 15, wherein the measuring means is configured to measure both or one of a control data traffic characteristic and a contents data traffic characteristic, as the traffic characteristic in the cell.

17. The mobile communication system according to claim 10, wherein the location registration areas are defined as spaces sectioned by latitude and longitude, three-dimensional structures and floors thereof, individual vehicle, individual train, individual ship, or individual airplane.

18. The mobile communication system according to claim 10, wherein the recognizing means is configured to recognize the location of its own through communication with a global positioning system or with surrounding base stations or through communication with the location information management server.

19. A base station which constitutes a mobile communication system together with a plurality of mobile stations, and a location information management server connected to a network and configured to manage location registration areas formed of cells and location information about locations of the mobile stations, which is connected to the network, and which is allowed to establish communication with surrounding base stations through radio or wire link, a location registration area being formed of cells established by said base station and surrounding base stations, the base station comprising:

recognizing means for, when the base station is newly installed in the mobile communication system, recognizing a location of its own, and state of location registration areas established by surrounding base stations, through communication with the surrounding base stations or through communication with the location information management server;

selecting means for selecting a location registration area to which the base station should belong, based on the location of its own and the state of the location registration areas thus recognized; and broadcasting means for notifying the location information management server that the base station is newly installed in the location registration area, and for broadcasting a location registration area identifier for identifying the location registration area, to the mobile stations through a broadcast channel.

20. The base station according to claim 19, further comprising:

measuring means for measuring a traffic characteristic in a cell established by the base station; and traffic notifying means for notifying the location information management server of the traffic characteristic obtained by measurement by the measuring means.

21. The base station according to claim 20, wherein the measuring means is configured to measure both or one of a control data traffic characteristic and a contents data traffic characteristic, as the traffic characteristic in the cell.

22. The base station according to claim 19, further comprising:

measuring means for measuring a traffic characteristic in a cell established by the base station;

information exchanging means for exchanging information about the traffic characteristic through communication with surrounding base stations; and increasing/decreasing means for increasing or decreasing the number of base stations constituting a location registration area to which the base station belongs, so as to average traffics in the respective location registration areas, based on the traffic characteristic obtained by exchange by the information exchanging means.

23. The base station according to claim 22, wherein the measuring means is configured to measure both or one of a control data traffic characteristic and a contents data traffic characteristic, as the traffic characteristic in the cell.

24. The base station according to claim 19, wherein the recognizing means is configured to recognize the location of its own through communication with a global positioning system or with surrounding base stations or through communication with the location information management server.

25. A location registration area configuring method in a mobile communication system which comprises a plurality of mobile stations, a plurality of base stations connected to a network, and a location information management server connected to the network and configured to manage location registration areas formed of cells established by the base stations and location information about locations of the mobile stations, and in which each of said base stations is allowed to establish communication with surrounding base stations through radio or wire link, said method comprising:

a recognizing step wherein a newly installed base station recognizes a location of its own and a state of location registration areas established by surrounding base stations;

a selecting step wherein said newly installed base station selects a location registration area to which it should belong based on the location of its own and the state of the location registration areas thus recognized;

a measuring step wherein said base station measures a traffic characteristic in a cell established by the base station;

a measuring step wherein said base station measures a traffic characteristic in a cell established by the base station;

a traffic notifying step wherein said base station notifies the location information management server of the traffic characteristic obtained by measurement; and an increasing/decreasing step wherein the location information management server increases or decreases the number of base stations constituting each location registration area so as to average traffics in the respective location registration areas, based on the traffic characteristic thus notified of.

26. A location registration area configuring method in a mobile communication system which comprises a plurality of mobile stations, a plurality of base stations connected to a network, and a location information management server connected to the network and configured to manage location registration areas formed of cells established by the base stations and location information about locations of the mobile stations, and in which each of said base stations is allowed to establish communication with surrounding base stations through radio or wire link, said method comprising:

a recognizing step wherein a newly installed base station recognizes a location of its own and a state of location registration areas established by surrounding base stations;

a selecting step wherein said newly installed base station selects a location registration area to which it should belong based on the location of its own and the state of the location registration areas thus recognized;

a measuring step wherein said base station measures a traffic characteristic in a cell established by the base station;

an information exchanging step wherein said base station exchanges information about the traffic characteristic through communication with surrounding base stations; and an increasing/decreasing step wherein the number of base stations constituting a location registration area to which the base station belongs is increased or decreased so as to average traffics in respective location registration areas, based on traffic characteristics obtained by exchange.

27. A base station which constitutes a mobile communication system together with a plurality of mobile stations, and a location information management server connected to a network and configured to manage location registration areas formed of cells and location information about locations of the mobile stations, which is connected to the network, and which is allowed to establish communication with surrounding base stations through radio or wire link, a location registration area being formed of cells established by said base station and surrounding base stations, the base station comprising:

recognizing means for, when the base station is newly installed in the mobile communication system, recognizing a location of its own and a state of location registration areas established by surrounding base stations;

selecting means for selecting a location registration area to which the base station should belong based on the location of its own and the state of the location registration areas thus recognized;

measuring means for measuring a traffic characteristic in a cell established by the base station;

information exchanging means for exchanging information about the traffic characteristic through communication with surrounding base stations; and increasing/decreasing means for increasing or decreasing the number of base stations constituting a location registration area to which the base station belongs, so as to average traffics in the respective location registration areas, based on the traffic characteristic obtained by exchange by the information exchanging means.

* * * * *